United States Patent [19]
Yamamoto et al.

[11] Patent Number: 5,390,039
[45] Date of Patent: Feb. 14, 1995

[54] OPTICAL NETWORK FOR DETECTING COLLISIONS BASED ON THE REFLECTION OF A TRANSMITTING SIGNAL

[75] Inventors: Noboru Yamamoto, Fujisawa; Kenji Nakamura, Hadano, both of Japan

[73] Assignee: Canon Kabushiki Kaisha, Tokyo, Japan

[21] Appl. No.: 243,528

[22] Filed: May 16, 1994

Related U.S. Application Data

[63] Continuation of Ser. No. 80,585, Jun. 24, 1993, abandoned, which is a continuation of Ser. No. 748,811, Aug. 22, 1991, abandoned.

[30] Foreign Application Priority Data

Aug. 27, 1990 [JP] Japan ................................ 2-222514
Aug. 27, 1990 [JP] Japan ................................ 2-222515

[51] Int. Cl.⁶ ............................................. H04J 14/02
[52] U.S. Cl. ................................. 359/136; 359/173; 359/135; 370/85.3
[58] Field of Search ............. 359/110, 136, 143, 154, 359/111, 137, 173, 124, 152, 135; 370/85.2, 85.3

[56] References Cited

U.S. PATENT DOCUMENTS

| | | | |
|---|---|---|---|
| 3,928,805 | 12/1975 | MacTaggart | 455/127 |
| 4,516,221 | 5/1985 | Nakata et al. | 359/152 |
| 4,723,311 | 2/1988 | Moustakas et al. | 359/118 |
| 4,751,701 | 6/1988 | Roos et al. | 359/158 |
| 4,809,361 | 2/1989 | Okada et al. | 359/111 |
| 4,815,802 | 3/1989 | Nakamura | 350/96.13 |
| 4,975,926 | 12/1990 | Knapp | 359/159 |
| 5,005,212 | 5/1991 | Wood . | |

FOREIGN PATENT DOCUMENTS

| | | | |
|---|---|---|---|
| 224730 | 7/1985 | Germany | 359/110 |
| 56-62436 | 5/1981 | Japan | 359/115 |
| 56-87946 | 7/1981 | Japan | 359/154 |
| 58-132674 | 8/1983 | Japan | 359/110 |
| 58-204644 | 11/1983 | Japan | 359/110 |

OTHER PUBLICATIONS

"Services Integration and Multiplexing for Broad-Band Communication Systems", I.E.E.E. Journal on Selected Areas in Communications, vol. SAC-4, No. 4, Jul. 1986, pp. 551-564.

Primary Examiner—Richard E. Chilcot, Jr.
Assistant Examiner—Rafael Barares
Attorney, Agent, or Firm—Fitzpatrick, Cella, Harper & Scinto

[57] ABSTRACT

When a communication network system is constructed using an optical fiber as a transmission path, a node which transmits a signal may receive its own transmission signal upon reflection of an optical signal on the transmission path. When access control to a network is performed by a CSMA/CD method, the reflection signal may be erroneously detected as a signal sent from another node, and a collision which has not actually occurred may be detected. In order to avoid this, a reflection signal component of the transmission signal must be removed from a reception signal. For this purpose, a time-inverted signal of the transmission signal, and the reception signal are modulated, and the modulated signals are then input to a convolver, thereby obtaining a convolution integral value between the two signals. Since the transmission signal component included in the reception signal can be detected from the obtained value, the detected transmission signal component is removed from the reception signal component, and a signal transmitted from another node can be extracted. In this manner, erroneous detection of a collision upon reflection of a signal transmitted from its own node can be prevented.

80 Claims, 7 Drawing Sheets

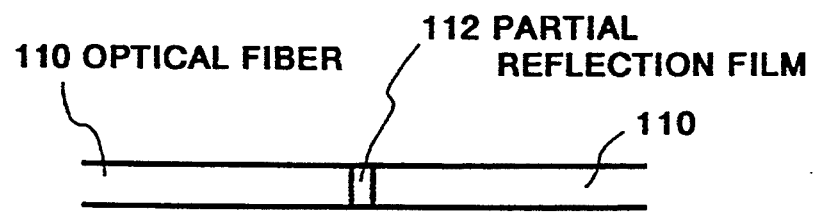
F I G. 5(a)
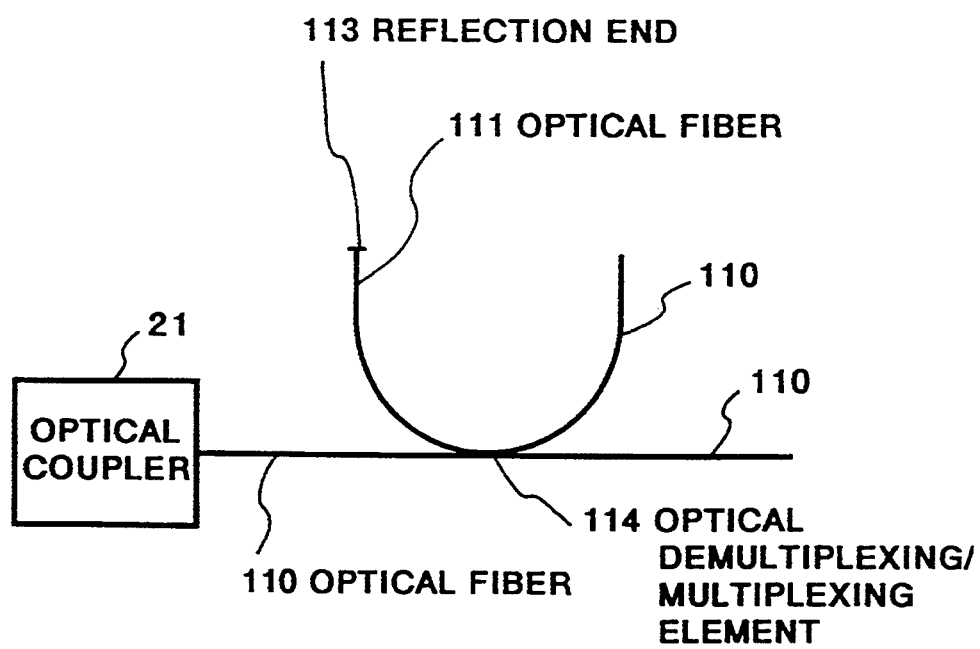
F I G. 5(b)

OPTICAL NETWORK FOR DETECTING COLLISIONS BASED ON THE REFLECTION OF A TRANSMITTING SIGNAL

This application is a continuation of application Ser. No. 08/080,585, filed Jun. 24, 1993, now abandoned, which in turn is a continuation of application Ser. No. 07/748,811, filed Aug. 22, 1991, now abandoned.

BACKGROUND OF THE INVENTION

1. Field of the IventionN

The present invention relates to an optical communication network having a collision detection function of transmitted optical signals.

2. Prior Art of the Invention

As one multiplex method in an optical communication network utilizing an optical fiber, a CSMA/CD (Carrier Sense Multiple Access/Collision Detection) method conventionally used an electrical communication network is employed.

FIG. 7 is a schematic block diagram of a communication interface unit of a terminal device employing the CSMA/CD method in the optical communication network (to be referred to as an optical CSMA/CD method hereinafter). The operation of the terminal will be described below with reference to FIG. 7.

As shown in FIG. 7, a terminal 39 connected to an optical fiber 10 via a optical coupler 21 and a communication interface transmits a signal to be transmitted onto the optical fiber 10, and sends it to another terminal on the network. In this case, a transmission operation based on the optical CSMA/CD method is performed in the following protocol.

The terminal 39 which requests transmission outputs a control signal indicating a data transmission request to a communication controller 34. Upon reception of this signal, the communication controller 34 causes a carrier detector 25 to check if a signal from another terminal is transmitted onto the optical fiber 10. If it is detected that no signal from another terminal exists on the optical fiber 10, the communication controller 34 outputs, to the terminal 39, a control signal indicating that it is possible to start transmission. A transmission signal output from the terminal 39 in response to this control signal is encoded by an encoder 31, and the encoded signal is then converted into an optical signal by an optical transmitter 24. The optical signal is transmitted onto the optical fiber 10 via a demultiplexing/multiplexing element 22 and the optical coupler 21. In this case, the signal sent from the encoder 31 is input to the carrier detector 25, a collision detector 35 and a decoder 30 together with a signal received by an optical receiver 23, thereby the communication controller 34 monitors whether or not the transmission signal is normally transmitted.

With the above-mentioned protocol, data transmission from the terminal 39 is started. At the same time, another terminal connected to the optical fiber 10 may start transmission. In order to cope with such a case, the communication controller 34 causes the optical receiver 23 and the collision detector 35 to monitor whether or not a signal from another terminal is transmitted onto the optical fiber 10 while the terminal 39 is transmitting data.

When the collision detector 35 detects a collision between a signal transmitted from its own terminal 39 and a signal from another terminal, the communication controller 34 informs to the terminal 39 using a control signal indicating that the collision occurred, and sends a cancel signal indicating that the transmitting signal is invalidated, onto the optical fiber 10 via the encoder 31. After an elapse of a randomly set time, the communication controller 34 re-executes the above-mentioned transmission protocol, and restarts the interrupted data transmission.

However, the prior art suffers from the following problems.

As shown in FIG. 7, on a transmission path using the optical fiber 10, light reflection is inevitably caused by a connecting portion, e.g., a connecting portion between the optical coupler 21 and the optical fiber 10, a connecting portion between optical fibers 10, or the like. In particular, when a bus-type network is employed as a network pattern, so that terminals can be relatively freely connected/disconnected, it is difficult to eliminate reflection at the connecting portions.

On the transmission path of the optical fiber 10, when a connecting portion which reflects light is at a distance of x meters from the optical coupler 21, light transmitted from the optical coupler 21 onto the optical fiber 10 is reflected and returned after $(2x/C_f)$ sec (where $C_f$ is the light propagation speed in the optical fiber).

If a delay time $(2x/C_f)$ of a reflected wave is sufficiently shorter than a time corresponding to one bit of a signal to be transmitted, no problem is posed. However, if the delay time is almost equal to or longer than the time corresponding to one bit, the collision detector 35 cannot identify whether a detected signal is a signal which is transmitted from its own terminal and reflected, or a signal from another terminal. As a result, the collision detector 35 may erroneously detect a collision of signals.

For example, if a transmission speed is set to be 100 Mbps, the one-bit length of the signal is 10 nsec. In this case, if the distance x is about 2m or more, a collision is erroneously detected.

SUMMARY OF THE INVENTION

The present invention has been made to solve the above problems, and has its object to provide a reliable optical communication network, which can prevent erroneous detection of a transmission signal which is transmitted from its own terminal and reflected by a portion in a transmission path as a collision with a transmission signal from another terminal.

Another object of the present invention is to provide an optical communication network having a collision detection function of transmitted optical signals which comprises detection means for detecting a reflection signal generated upon reflection of a transmission signal at an intermediate portion of a transmission path from a reception signal, and removing means for removing the reflection signal detected by the detection means from the reception signal.

A Further object of the present invention is to provide an optical communication network connected through an optical transmission path, and having a collision detection function of transmitted optical signals which comprises reflection means for reflecting a transmission signal, and detection means for detecting a signal collision on the basis of the signal reflected by the reflection means.

Other features and advantages of the present invention will be apparent from the following description taken in conjunction with the accompanying drawings,

BRIEF DESCRIPTION OF THE DRAWINGS

FIGS. 5(a) and 5(b) are schematic views showing light reflection portions in the third embodiment;

DETAILED DESCRIPTION OF THE PREFERRED EMBODIMENTS

The preferred embodiments of the present invention will be described below with reference to the accompanying drawings.

<First Embodiment>

Figure 1:
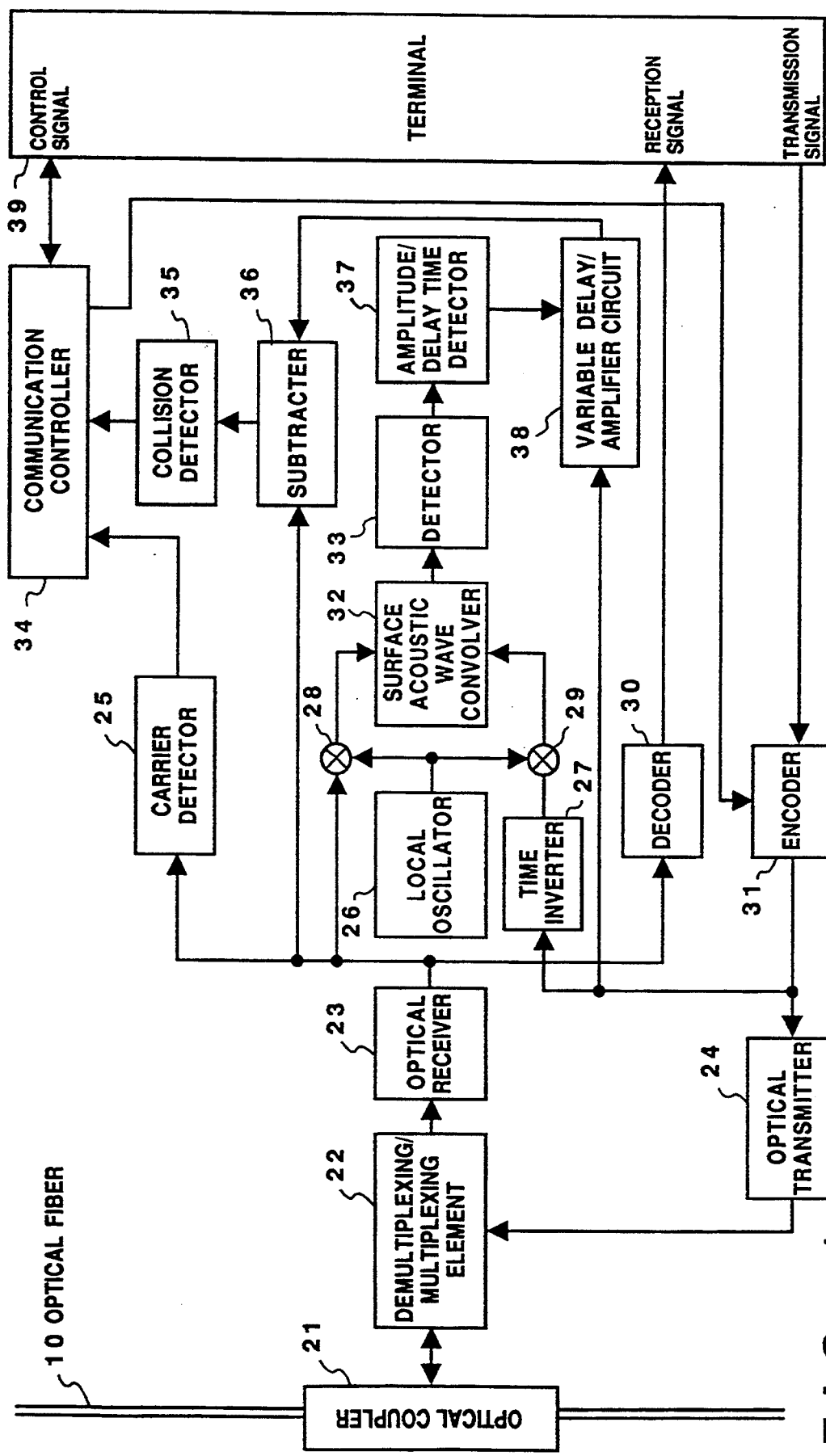
FIG. 1 is a block diagram showing a communication interface according to the first embodiment of the present invention.
Figure 2:
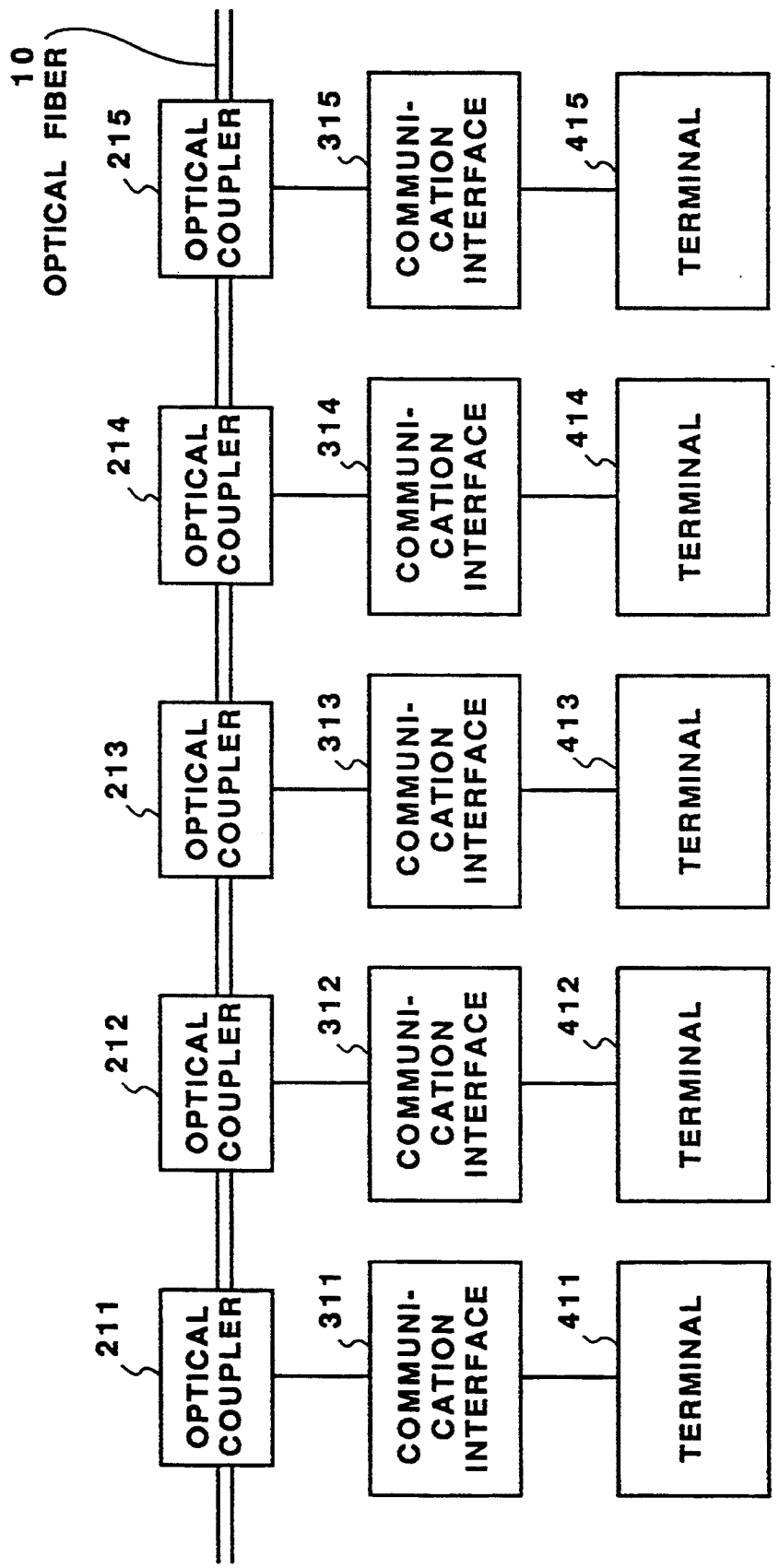
FIG. 2 is a schematic view showing an optical communication network of the first embodiment.

FIGS. 1 and 2 show an arrangement of the first embodiment of the present invention. FIG. 1 is a schematic block diagram showing an arrangement of a communication interface unit, and FIG. 2 is a schematic diagram showing a network arrangement using the unit shown in FIG. 1.

In FIG. 1, reference numeral 10 denotes a transmission path using an optical fiber, which path constitutes a communication network. Reference numeral 21 denotes a optical coupler for sending some light components on the optical fiber 10 to a demultiplexing/multiplexing element 22, and sending light components from the demultiplexing/multiplexing element 22 onto the optical fiber 10. Reference numeral 23 denotes an optical receiver for converting optical signals into electrical signals. The optical receiver 23 includes a photodetector, an amplifier, and the like. Reference numeral 24 denotes an optical transmitter for converting electrical signals into optical signals. The optical transmitter 24 includes a semiconductor laser, a driver for the laser, and the like.

Reference numeral 25 denotes a carrier detector for detecting whether or not a signal is transmitted onto the optical fiber 10. Reference numeral 26 denotes a local oscillator for generating a signal having a frequency almost equal to an input center frequency of a surface acoustic wave convolver 32 (to be described later). Reference numeral 27 denotes a time inverter for time-inverting a code string output from an encoder 31 (to be described later) in each unit time. Reference numerals 28 and 29 denote mixers. Reference numeral 30 denotes a decoder for decoding a code string converted by the optical receiver 23 into a normal signal. Reference numeral 31 denotes the encoder for encoding a signal to be transmitted into a code string suitable for transmission on the transmission path.

Reference numeral 32 denotes the surface acoustic wave convolver for performing a convolution integral operation of input signals from the mixers 28 and 29. Reference numeral 33 denotes a detector. Reference numeral 34 denotes a communication controller for controlling transmission/reception with a terminal 39 (to be described later). Reference numeral 35 denotes a collision detector for detecting a collision of signals, and informing it to the communication controller 34. Reference numeral 36 denotes a subtracter for subtracting an output signal from the encoder 31 from an output signal from the optical receiver 23. Reference numeral 37 denotes an amplitude/delay time detector for detecting an amplitude difference and a delay time between two input signals of the surface acoustic wave convolver 32 using an output signal from the detector 33. Reference numeral 38 denotes a variable delay/amplifier circuit for amplifying/delaying an output signal from the encoder 31 on the basis of a detection result of the amplitude/delay time detector 37, and for transmitting/receiving signals.

Each of components 211 to 215 shown in FIG. 2 corresponds to the optical coupler 21 shown in FIG. 1, and each of components 411 to 415 corresponds to the terminal 39. Each of components 311 to 315 represents the overall arrangement excluding the optical fiber 10, the optical coupler 21, and the terminal 39 from the arrangement shown in FIG. 1, and will be referred to as a communication interface (I/F) hereinafter.

As shown in FIG. 2, this embodiment employs a so-called bus-type network as a network pattern. Each terminal sends a signal onto the optical fiber 10 via the optical coupler using the communication I/F. Each terminal fetches some signal components on the optical fiber 10 via the optical coupler into the communication I/F, thereby receiving the signal.

The operation of the communication I/F of the first embodiment will be described in detail below with reference to FIG. 1. In the following description, a case will be exemplified wherein a signal is transmitted from the terminal 39.

When the terminal 39 transmits a signal according to a normal CSMA/CD protocol, it outputs a transmission request signal to the communication controller 34. In response to this signal, the communication controller 34 causes the carrier detector 25 to check whether or not a signal from another terminal is transmitted onto the optical fiber transmission path 10. As a result, if it is detected that no signal from another terminal is transmitted onto the optical fiber 10, the communication controller 34 outputs a signal for permitting transmission to the terminal 39. Upon reception of this signal, the terminal 39 causes the encoder 31 to convert a transmission signal into a code string suitable for a communication, and then causes the optical transmitter 24 to convert the code string into an optical signal. Thereafter, the terminal 39 transmits the optical signal onto the optical fiber 10 via the demultiplexing/multiplexing element 22 and the optical coupler 21.

At this time, as described above, a plurality of terminals may start transmission at almost the same time due to a transmission delay time of signals on the optical fiber 10. In addition, a signal reflected by a reflection surface in the optical fiber is transmitted through the optical coupler 21. The communication I/F of this embodiment identifies these signals as follows, and detects a collision with a signal transmitted from another terminal without erroneously detecting a reflection signal as a collision.

The optical signal on the optical fiber 10 is transmitted to the receiver 23 via the demultiplexing/multiplexing element 22 and converted into an electrical signal by the optical receiver 23. The electrical signal is then mixed with a signal from the local oscillator 26 by the mixer 28. The output signal from the mixer 28 is input to one input transducer of the surface acoustic wave convolver 32. On the other hand, the transmission signal encoded by the encoder 31 is time-inverted by the time inverter 27 in each unit time, and the inverted signal is mixed with the signal from the local oscillator 26 by the mixer 29. The output signal from the mixer 29 is input to the other transducer of the surface acoustic wave convolver 32.

The surface acoustic wave convolver performs a convolution integral operation of two input signals by utilizing nonlinearity of a surface acoustic wave substrate itself or nonlinearity of a depletion layer of a semiconductor arranged adjacent to the surface acoustic wave substrate, as described in detail in, e.g., "Surface Acoustic Wave Engineering" edited by Mikio Shibayama, Society of Electronic Communications, pp. 221–225. More specifically, if modulated signals $F(t)e^{jwt}$ and $G(t)e^{jwt}$ are input to the two transducers, a signal given by the following equation is output to an output electrode:

$$H(t) = ke^{j2wt} \int F(\tau) \cdot G(2t-\tau-T) d\tau \tag{1}$$

where T is the propagation delay time of a convolution region of the surface acoustic wave convolver.

Upon qualitative interpretation of equation (1), when a time-inverted signal of a signal G(t) is not similar to (has no correlation with) a signal F(t) at all, an output H(t) is zero. As the two signals become close to each other, a pulse output signal is generated. When the two signals are equal to each other, the output is maximized. When one signal is delayed from the other signal, an output pulse is output while being delayed in accordance with the delay amount.

In this embodiment, a signal input from the optical receiver 23 corresponds to the signal F(t) described above, and a signal input from the encoder 31 corresponds to the signal G(t). The local oscillator 26 generates the above-mentioned $e^{jwt}$, and its frequency can be selected to be near the center frequency of the input transducers of the surface acoustic wave convolver 32.

The output signal H(t) from the surface acoustic wave convolver 32 is input to the detector 33, and a component $e^{j2wt}$ is removed from the signal H(t). Thus, the output signal from the detector 33 is input to the amplitude/delay time detector 37.

In this manner, information indicating whether or not the same code string is included in both the signal input from the optical receiver 23 and the signal input from the encoder 31, and information indicating a delay amount of the code string if it is included are obtained from the output signal from the detector 33. When the same code string is included, this means that its own transmission signal reflected on the optical fiber transmission path 10 is received, and the presence/absence of a reflection signal and its delay time can be detected based on the output signal from the detector 33. Since the transmission signal and the reflection signal include a perfectly identical code string (F(t)=G(t)), an attenuation amount of the reflection signal can also be detected based on the value of the coefficient k.

The output signal from the encoder 31 is properly delayed and amplified (or attenuated) by the variable delay/amplifier circuit 38 in accordance with the information indicating the presence/absence of the reflection signal, the delay time of the reflection signal, and the attenuation amount obtained in this manner. The output signal from the delay/amplifier circuit 38 is subtracted from a reception signal input via the optical receiver 23 by the subtracter 36, thereby a reflection component of the transmission signal from its own terminal is removed from the reception signal, and only a Signal component from another terminal can be input to the collision detector 35.

The communication controller 34 receives the output signal from the collision detector 3.5, and monitors whether or not a collision with a signal from another terminal occurs during transmission of a signal from its own terminal. When a collision occurs, the controller 34 informs this to the terminal 39, and sends a cancel signal indicating that the transmission signal is invalidated onto the optical fiber transmission path 10 via the encoder 31.

As described above, in the optical communication network of this embodiment, since a terminal which performs data transmission performs collision detection with always removing a reflection signal of a transmission signal output from its own terminal from a reception signal, a collision can be prevented from being erroneously detected due to the reflection signal.

<Second Embodiment>

The second embodiment of the present invention will be described below with reference to FIG. 3.

Figure 3:
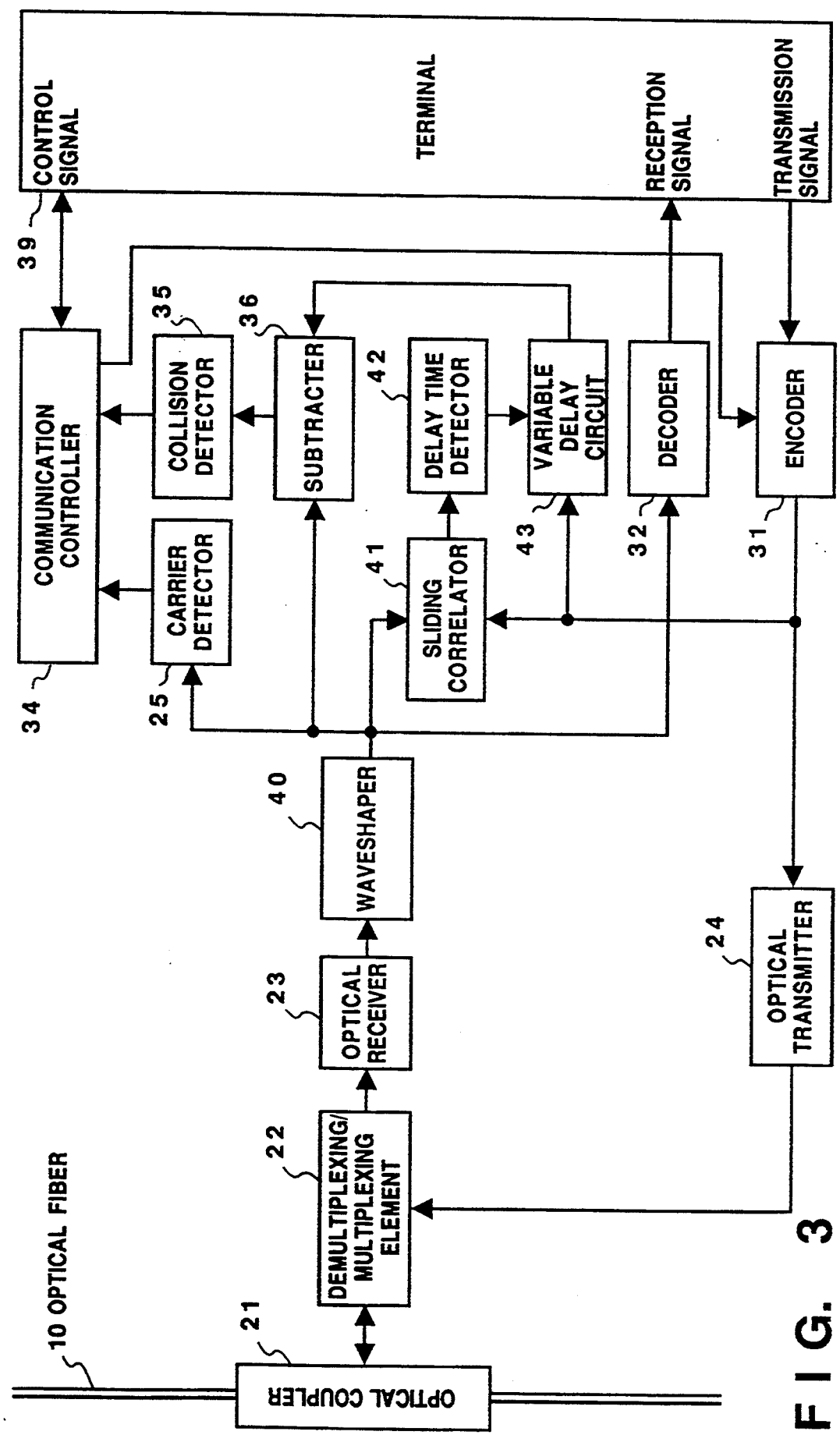
FIG. 3 is a block diagram showing a communication interface according to the second embodiment of the present invention.

FIG. 3 is a schematic block diagram showing an arrangement of a communication interface unit of the second embodiment. The second embodiment can also be suitably used in an optical communication network shown in FIG. 2 like in the first embodiment.

Note that the same reference numerals in FIG. 3 denote blocks having the same functions as those in FIG. 1, and a description thereof will be omitted. A difference from the first embodiment is that the time inverter 27, the local oscillator 26, the surface acoustic wave convolver 32, and the mixers 28 and 29 are removed, and a waveshaper 40 and a sliding correlator 41 are added. In place of the variable delay/amplifier circuit 38 used in the first embodiment, a variable delay circuit 43 is used in this embodiment.

A principal difference in operation between this embodiment and the first embodiment described above is as follows. That is, in the first embodiment, when a reflection signal of a signal transmitted from its own terminal is identified, a signal is processed as an analog amount. However, in this embodiment, the signal is processed as a digital amount. The operation of the second embodiment will be described below with reference to FIG. 3. Note that a protocol at the beginning of transmission is the same as that in the first embodiment.

When the terminal 39 starts transmission, an optical signal received via the optical coupler 21 is transmitted to the optical receiver 23 via the demultiplexing/multiplexing element 22 and converted into an electrical signal by the optical receiver 23. The electrical signal is input to the waveshaper 40. The waveshaper 40 has a function of converting the input signal into a digital signal. More specifically, the optical receiver 23 outputs an electrical signal of a voltage proportional to the intensity of an input optical signal. The waveshaper 40 detects a threshold value of voltages corresponding to "0" and "1" from the output electrical signal, determines whether the input signal is "0" or "1" at each timing, and outputs a corresponding voltage. The output signal from the waveshaper 40 is input to one input terminal of the sliding correlator 41. The other input terminal of the correlator 41 receives an output signal from the encoder 31.

The sliding correlator 41 is a kind of digital circuit, and compares two input code strings while sliding them along the time base, thereby obtaining a correlation between the two input code strings. More specifically, the sliding correlator 41 compares two code strings while shifting them along the time base, and when two code strings coincide with each other, the correlator 41 outputs a maximum signal. By using the correlator 41, whether or not the output signal from the waveshaper 40 and the output signal from the encoder 31 include the same code string, i.e., whether or not an input signal from the optical transmission path 10 includes a reflection signal component, can be detected. If the reflection signal component is included, a delay amount of the reflection signal from an original signal can also be detected.

In this manner, since the presence/absence of a reflection signal and its delay time can be detected, the output signal from the encoder 31 is delayed by a time corresponding to the detected delay time by the variable delay circuit 43. The subtracter 36 subtracts the output signal from the delay circuit 43 from the output signal from the waveshaper 40. In this manner, a reflection signal component of a transmission signal from its own terminal can be removed from a reception signal.

Thereafter, this signal is input to the collision detector 35 and collision detection is performed. The protocol after the collision is detected is the same as that in the first embodiment.

Since the first embodiment employs a surface acoustic wave convolver 32, processing for identifying a reflection signal component of a transmission signal from its own terminal can be performed at high speed, and the first embodiment is suitable for high-speed data transmission. However, since the first embodiment requires a local oscillator 26, a time inverter 27, and the like, a system becomes relatively expensive. On the other hand, since the second embodiment employs a sliding correlator 41, and performs identification processing of a reflection signal in a digital manner, a relatively inexpensive system can be realized although the second embodiment may not be applied to high-speed transmission.

The present invention has been briefly described using the first and second embodiments. However, the present invention is not limited to these two embodiments. In each of the above embodiments, a surface acoustic wave convolver or a sliding correlator is used to perform a convolution integral operation or a correlation operation of signals. However, for example, a CCD correlator may be used as long as it can provide the same function as that of the convolver or the correlator.

<Third Embodiment>

Figure 4:
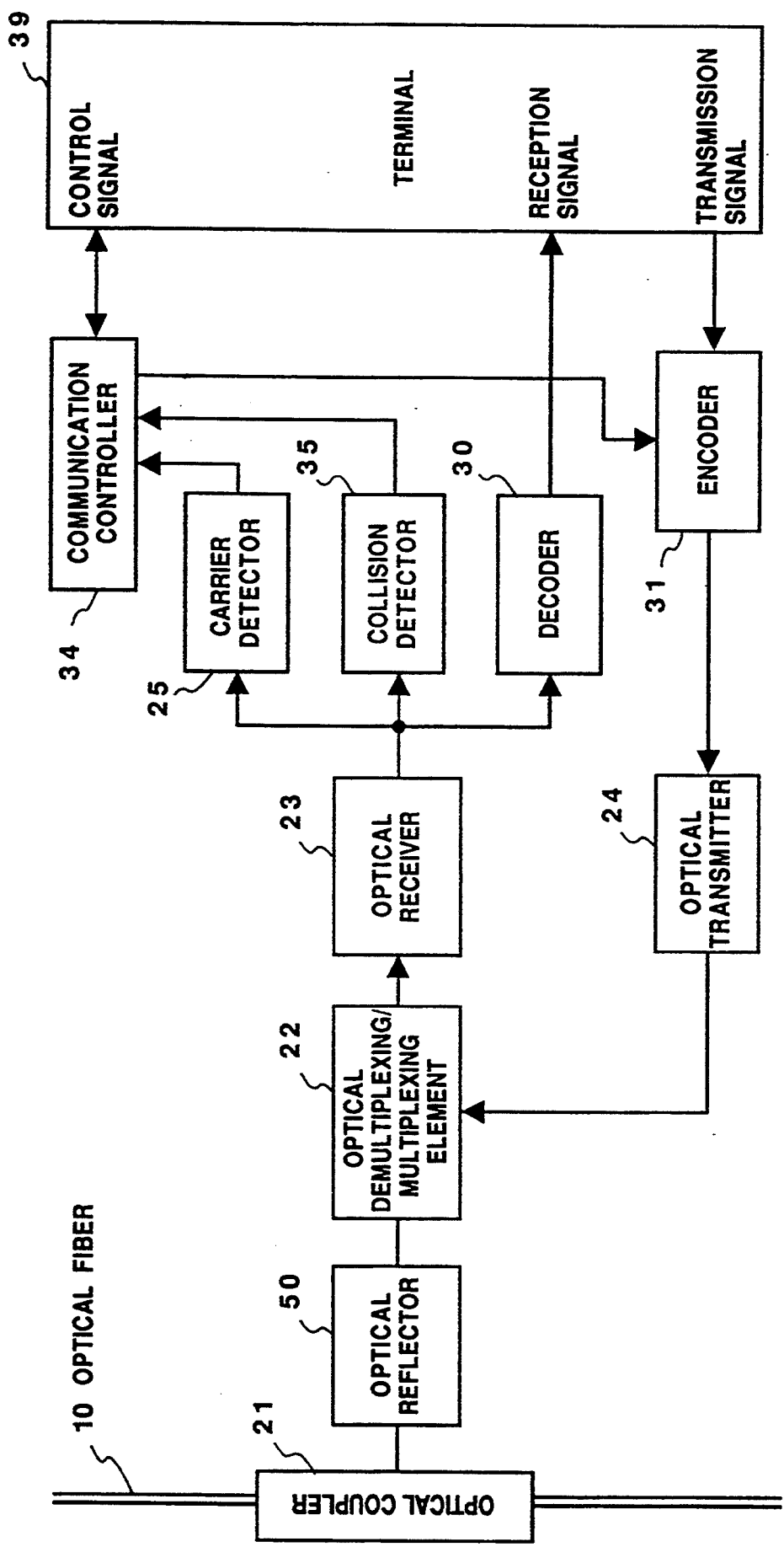
FIG. 4 is a block diagram showing a communication interface according to the third embodiment of the present invention.

FIG. 4 shows the third embodiment of the present invention. FIG. 4 is a schematic block diagram showing an arrangement of a node of a network, and a network has the same arrangement as that shown in FIG. 2.

In FIG. 4, reference numeral 10 denotes an optical fiber as a transmission path, which constitutes a communication network. Reference numeral 21 denotes a optical coupler for sending some light components on the optical fiber 10 to a demultiplexing/multiplexing element 22, and sending light components from the demultiplexing/multiplexing element 22 onto the optical fiber 10. Reference numeral 23 denotes an optical receiver for converting optical signals into electrical signals. The optical receiver 23 includes a photodetector, an amplifier, and the like. Reference numeral 24 denotes an optical transmitter for converting electrical signals into optical signals. The optical transmitter 24 includes a light source such as a semiconductor laser, a driver for the laser, and the like. Reference numeral 50 denotes a light reflector for reflecting some components of an optical signal sent from the optical transmitter 24, and returning the reflected light components to the optical receiver 23.

Reference numeral 34 denotes a communication controller for controlling transmission/reception of signals of a terminal 39. Reference numeral 25 denotes a carrier detector for detecting whether or not a signal is transmitted onto the optical fiber 10. Reference numeral 35 denotes a collision detector for detecting a collision between a transmission signal from its own terminal 39 and a transmission signal from another terminal. Reference numeral 30 denotes a decoder for decoding a code string received by the optical receiver 23 into a normal signal. Reference numeral 31 denotes an encoder for encoding a signal transmitted from the terminal 39 into a code string suitable for transmission on the transmission path. Reference numeral 39 denotes the terminal for transmitting/receiving signals.

This embodiment also employs a so-called bus-type optical network as a network pattern. Each terminal sends a signal onto the optical fiber 10 via the optical coupler 21 using the communication I/F, or causes the optical coupler 21 to fetch some components of signals on the transmission path 10 into the communication I/F, thereby receiving signals.

The operation of the communication I/F of the third embodiment will be described in detail below with reference to FIG. 4. In the following description, a case will be exemplified wherein a signal is transmitted from the terminal 39.

When the terminal 39 sends a signal according to a normal CSMA/CD protocol, the transmission terminal 39 outputs a transmission request signal to the communication controller 34. In response to this signal, the communication controller 34 causes the carrier detector 25 to check whether or not a signal from another terminal is transmitted onto the optical fiber transmission path 10. As a result, if it is determined that no signal is transmitted onto the optical fiber 10, the communication controller 34 outputs a signal for permitting transmission to the terminal 39. Upon reception of this signal, the terminal 39 causes the encoder 31 to convert a transmission signal into a code string suitable for a communication, and then causes the optical transmitter 24 to convert the code string into an optical signal. The terminal 39 then transmits the optical signal onto the optical fiber 10 via the optical demultiplexing/multiplexing element 22, the light reflector 50, and the optical coupler 21.

At this time, some components of the optical signal sent from the optical transmitter 24 are reflected by the light reflector 50, and are input on the optical receiver 23 via the optical demultiplexing/multiplexing element 22. In this manner, the terminal 39 monitors the transmission signal using the optical signal reflected by the light reflector 50.

When the terminal 39 transmits a signal, two cases must be identified. More specifically, as described above, one case is that another terminal has started transmission at almost the same time due to a transmission delay of a signal on the optical fiber 10. Another case is that the transmission signal from its own terminal, which signal is reflected by a reflection surface on the optical fiber transmission path 10 is transmitted to the optical receiver 23 of its own node via the optical coupler 21.

In the former case, an optical signal from another terminal, and a transmission optical signal from its own terminal, which signal is partially reflected by the light reflector 50, are input on the optical receiver 23, and a signal collision is detected by the collision detector 35. After an elapse of a predetermined period of time, the normal CSMA/CD re-transmission protocol is executed.

In the latter case, erroneous detection of a signal collision can be avoided by the node of the present invention as follows.

The reflectance of the light reflector 50 is set so that, of optical signal components transmitted from the optical transmitter 24, the amount of light components reflected by the light reflector 50 and incident on the optical receiver 23 is sufficiently larger than the amount of light components reflected on the optical fiber transmission path 10, and returned to the optical receiver 23. In this case, if the minimum light-receiving sensitivity of the optical receiver 23 is set to be an intermediate value between the amount of light components reflected by the light reflector 50 and the amount of light components reflected by the reflection surface on the optical fiber transmission path 10, the optical receiver 23 can detect only the optical signal components reflected by the light reflector 50, and interference caused by the optical signal components reflected by the reflection surface on the optical fiber transmission path 10 can be eliminated, thus avoiding erroneous detection of a signal collision.

Since the amount of light components returned from the optical fiber transmission path 10 depends on the arrangement of the optical communication network, e.g., the number of connecting portions on the optical fiber transmission path 10, distances to the connecting portions, and the like, the reflectance of the light reflector 50 can be selected in correspondence with the arrangement of the optical communication network according to the above-mentioned setting method.

FIGS. 5(a) and 5(b) are schematic views showing the light reflector 50 of this embodiment. In FIG. 5(a), when the optical coupler 21 and the optical demultiplexing/multiplexing element 22 are connected through an optical fiber 110, a partial reflection film 112 for reflecting some components of incident light is arranged midway along the optical fiber 110.

In FIG. 5(b), an optical demultiplexing/multiplexing device 114 prepared by, e.g., welding using an optical fiber is utilized. In this case, the terminal end of one optical fiber 111 connected to the optical coupler 21 serves as a reflection end 113. The reflectance of each of the partial reflection film 112 and the reflection end 113 can be set so that reflection light having a sufficiently larger light amount than that of return light from the optical fiber transmission path as an error signal can be returned to the optical receiver 23, thereby preventing erroneous detection of a signal collision.

The light reflector shown in FIG. 5(b) utilizes the optical demultiplexing/multiplexing device 114. The optical demultiplexing/multiplexing device 114 may be used as the optical demultiplexing/multiplexing element 22 shown in FIG. 4. In this manner, the light reflector 50 may be arranged in the optical demultiplexing/multiplexing element 22 as long as it has the above-mentioned function. Similarly, the reflector 50 may be arranged in the optical coupler 21.

<Fourth Embodiment>

The fourth embodiment of the present invention will be described below with reference to FIG. 6.

Figure 6:
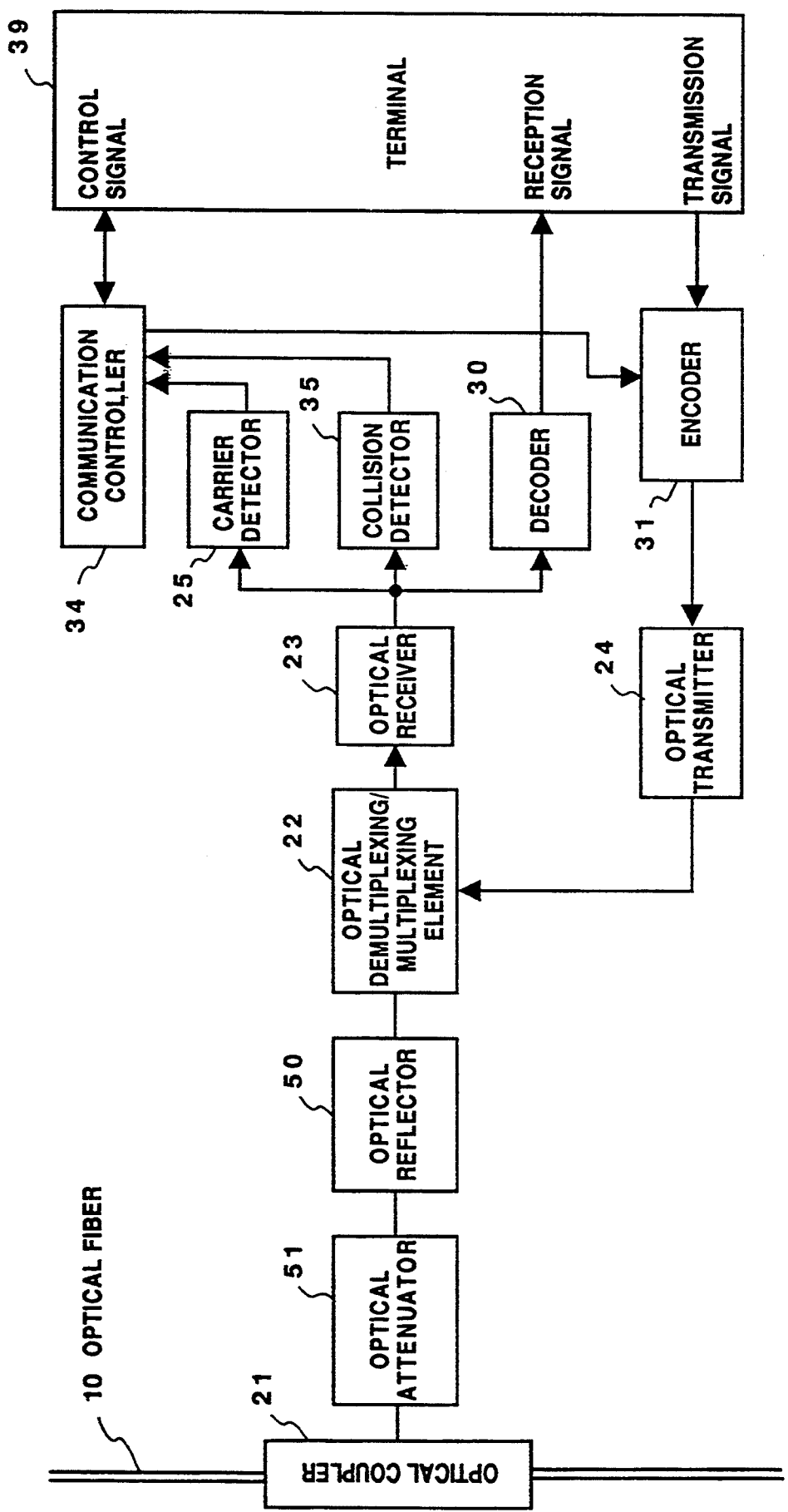
FIG. 6 is a block diagram showing a communication interface according to the fourth embodiment of the present invention.
Figure 7:
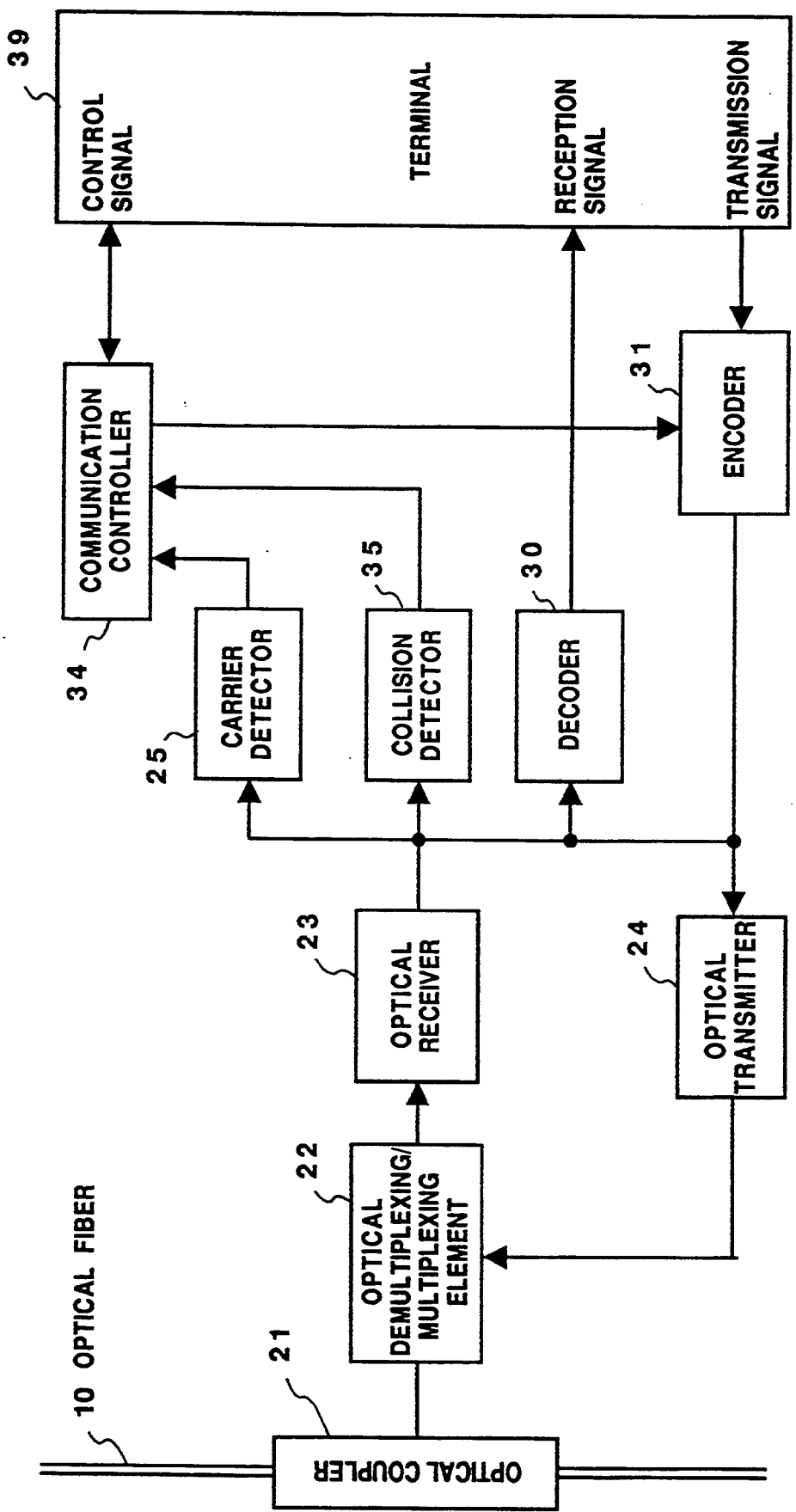
FIG. 7 is a block diagram for explaining a conventional optical CSMA/CD method.

FIG. 6 is a schematic block diagram showing an arrangement of a node of this embodiment. This embodiment can also be suitably used in the optical communication network shown in FIG. 2 like in the first embodiment.

Note that the same reference numerals in FIG. 6 denote blocks having the same functions as in FIG. 4, and a detailed description thereof will be omitted. A difference from FIG. 4 is that an optical attenuator 51 for decreasing the light amount of passing light is added between the optical coupler 21 and the light reflector 50.

The transmission and reception protocols of this embodiment are the same as those in the third embodiment. A difference from the third embodiment is as follows. Since the optical attenuator 51 is added, the light amount of an optical signal incident from another node to the optical receiver 23 is decreased by an attenuation amount defined by the optical attenuator 51, and the light amount of an optical signal returned to the optical receiver 23 upon reflection on the optical fiber transmission path 10 is decreased by the attenuation amount defined when the signal reciprocates through the optical attenuator 51.

Therefore, the difference between the light amount of a return signal incident from the light reflector 50 to the optical receiver 23 and the light amount of a return signal from the reflection surface on the optical fiber transmission path 10 is increased as compared to the third embodiment. When the minimum light-receiving sensitivity of the optical receiver 23 is set to be an intermediate value between the two light amounts, interference caused by the return signal from the reflection surface on the optical fiber transmission path 10 can be eliminated, and erroneous detection of a signal collision can be avoided.

Note that at least one optical attenuator 51 need only be arranged between the optical fiber transmission path 10 and the light reflector 50, and may be included in the optical coupler 21.

According to this embodiment, since the light amount of a signal returned from the reflection surface on the optical fiber transmission path 10 to the optical receiver 23 can be decreased more than that in the third embodiment, performance in preventing erroneous detection of a signal collision can be improved.

In each of the third and fourth embodiments, the number of the light reflectors 50 is not limited to one. A plurality of light reflectors 50 may be arranged as long as erroneous detection of a monitor signal and a signal collision can be prevented.

In each of the first to fourth embodiments, the description has been made using a normal bus-type optical communication network as an example. However, the present invention can be applied to any other optical communication networks, such as a bus-type optical communication network in which an optical amplifier is arranged on a communication path, or a non-bus type network, e.g., a star-type optical communication network, or a loop-type optical communication network, as long as a transmission signal from its own node is returned to the optical receiver 23, and causes erroneous detection of a signal collision.

Furthermore, the present invention can be applied to an optical communication network which is multiplexed using, e.g., a waveform multiplexing method if a system requires collision detection of signals on a transmission path.

As many apparently widely different embodiments of the present invention can be made without departing from the spirit and scope thereof, it is to be understood that the invention is not limited to the specific embodiments thereof except as defined in the appended claims.

What is claimed is:

1. An optical communication network having an optical signal collision detection function, comprising:
    optical coupler means for transmitting a transmission signal to an optical fiber and receiving a reception signal or a combined signal of the reception signal and a reflected signal from the optical fiber, the reflected signal resulting from the transmission signal being reflected at an intermediate portion of a transmission path including the optical fiber;
    detection means, which inputs the transmission signal to be transmitted by said optical coupler means and the combined signal received by said optical coupler means, for detecting a signal collision on the basis of the transmission signal and the combined signal received by said optical coupler means and detecting a correlation between the transmission signal and the combined signal; and
    removing means for removing the reflected signal from the combined signal on the basis of the correlation detected by said detection means.

2. A network according to claim 1, wherein said detection means comprises a surface acoustic wave convolver, and detects a phase shift and an attenuation factor of the reflected signal with respect to the transmission signal on the basis of a convolution integral value between the transmission signal and the combined signal.

3. A network according to claim 1, wherein said detection means comprises a waveshaper and a correlator, and detects a phase shift of the reflected signal from the transmission signal on the basis of the correlation between the transmission signal and the combined signal shaped by said waveshaper.

4. A network according to claim 2, wherein said removing means generates a pseudo reflection signal by shifting a phase and an amplitude of the transmission signal on the basis of the detected phase shift and attenuation factor, and removes the pseudo reflection signal from the combined signal.

5. A network according to claim 3, wherein said removing means generates a pseudo reflection signal by shifting a phase of the transmission signal on the basis of the detected phase shift, and removes the pseudo reflection signal from the reception signal.

6. An optical communication network connected through an optical transmission path, and having a collision detection function of transmitted optical signals, comprising:
    transmission means for transmitting an optical transmission signal to the optical transmission path;
    reflection means, arranged on the optical transmission path, for reflecting the optical transmission signal from said transmission means;
    reception means for receiving a reflected transmission signal reflected by said reflection means and an optical reception signal from the optical transmission path; and
    detection means for detecting a signal collision on the basis of the optical reception signal and the reflected transmission signal received by said reception means.

7. A network according to claim 6, further comprising attenuation means, arranged between said optical transmission path and said reflection means, for attenuating a signal.

8. A network according to claim 6, wherein said reflection means comprises a partial reflection film for partially reflecting light.

9. A network according to claim 6, wherein said reflection means comprises an optical demultiplexing-/multiplexing device having a reflection end.

10. A network according to claim 6, wherein a reflectance of said reflection means is set so that an amount of the reflected transmission signal which is reflected by said reflection means and received by said reception means is larger than an amount of the optical transmission signal which is reflected at the optical transmission path and received by said reception means.

11. A network according to claim 6, wherein said reception means further comprises conversion means for converting the reflected transmission signal from said reflection means into an electrical signal, said detection means detecting the signal collision on the basis of the electrical signal converted by said conversion means.

12. A network according to claim 1, wherein said detection means detects, when the optical coupler means receives the combined signal, an amount of delay of the reflected signal on the basis of the transmission signal to be transmitted and the combined signal, and wherein said removing means removes the reflected signal on the basis of the amount of delay of the reflected signal.

13. A network according to claim 1, further comprising conversion means for converting an electrical signal, wherein said detection means detects the reflected signal on the basis of the electrical signal converted by said conversion means, and wherein said removing means removes the reflected signal on the basis of the electrical signal converted by said conversion means.

14. A communication apparatus for communicating via an optical fiber, comprising:
    transmission means for transmitting a transmission code to the optical fiber;
    reception means for receiving a reception code from the optical fiber;
    detection means, which inputs the transmission code to be transmitted by said transmission means and the reception code received by said reception means, for detecting a signal collision on the basis of the reception code and the transmission code and detecting a reflection code reflected at the optical fiber, included in the reception code; and removing means for removing the reflection code detected by said detection means from the reception code.

15. An apparatus according to claim 14, wherein said reception means further comprises conversion means for converting an optical signal from said optical fiber into an electrical signal, wherein said detection means detects the reflection code on the basis of the electrical signal converted by said conversion means, and wherein said removing means removes the reflection code on the basis of the electrical signal converted by said conversion means.

16. An apparatus according to claim 14, wherein said detection means detects, when the reflection code is contained in the reception code, an amount of delay of the reflection code on the basis of the input transmission code and the reception code, and wherein said removing means removes the reflection code on the basis of the amount of delay of the reflection code.

17. An apparatus according to claim 14, wherein said removing means detects a code collision of the basis of the reception signal from which the reflection code is removed.

18. An apparatus according to claim 14, wherein said detection means further comprises a surface acoustic wave convolver, and wherein said detection means detects a phase shift and an attenuation factor of the reflection code with respect to the transmission code on the basis of a convolution integral value between the transmission code and the reception code, together with the reflection code.

19. An apparatus according to claim 14, wherein said detection means comprises a waveshaper and a correlator, and wherein said detection means detects a phase shift of the reflection code from the transmission code on the basis of the correlation between the transmission code and the reception code shaped by said waveshaper, together with the reflection code.

20. An apparatus according to claim 18, wherein said removing means generates a pseudo reflection signal by shifting a phase and an amplitude of the transmission code on the basis of the detected phase shift and the attenuation factor, and removes the pseudo reflection signal from the reception code.

21. An apparatus according to claim 19, wherein said removing means generates a pseudo reflection signal by shifting a phase of the transmission code on the basis of the detected phase shift, and removes the pseudo reflection signal from the reception code.

22. A communication interface unit for connecting a communication apparatus to an optical fiber, comprising:
transmission means for transmitting an optical transmission signal to the optical fiber;
reception means for receiving an optical signal;
transfer means for transferring the optical transmission signal from said transmission means to the optical fiber and an optical reception signal from the optical fiber to said reception means;
reflection means, arranged between said transfer means and the optical fiber, for reflecting the optical transmission signal from said transmission means to said reception means; and
detection means for detecting a signal collision on the basis of a reception by said reception means, wherein said reception means receives the optical reception signal and the optical transmission signal reflected by said reflection means.

23. A unit according to claim 22, wherein a reflectance of said reflection means is set so that the amount of the optical transmission signal reflected by said reflection means and emitted to said reception means is larger than the amount of the optical transmission signal reflected at the optical fiber and emitted to said reception means.

24. A unit according to claim 22, wherein said reception means converts the optical signal into an electrical signal.

25. A unit according to claim 22, further comprising attenuation means, arranged between said optical fiber and said reflection means, for attenuating a signal.

26. A unit according to claim 22, wherein said reflection means comprises a partial reflection film for partially reflecting light.

27. A unit according to claim 22, wherein said reflection means comprises an optical demultiplexing/multiplexing device having a reflection end.

28. A network according to claim 1, further comprising second detection means for detecting an optical signal collision on the basis of an output of said removing means.

29. A network according to claim 1, wherein said detection means detects a time difference between the reflected signal included in the combined signal and the transmission signal, and
wherein said removing means comprises delay means for delaying the transmission signal in accordance with the time difference and removes the reflected signal on the basis of the transmission signal which is delayed by said delay means.

30. A network according to claim 1, wherein said detection means detects a level difference between the reflected signal included in the combined signal and the transmission signal, and
wherein said removing means comprises attenuation means for attenuating the transmission signal in accordance with the level difference and removes the reflected signal on the basis of the transmission signal which is attenuated by said attenuation means.

31. A communication apparatus for communicating via an optical fiber, comprising:
transmission means for transmitting a transmission code to the optical fiber;
reception means for receiving a reception code from the optical fiber;
reflection detection means, which inputs the transmission code to be transmitted by said transmission means and the reception code received by said reception means, for detecting a reflection code reflected at the optical fiber, included in the reception code; and
collision detection means for detecting a code collision on the basis of the reception code received by said reception means and the reflection code detected by said reflection detection means.

32. An apparatus according to claim 31, wherein said reception means further comprises conversion means for converting an optical signal from said optical fiber into an electrical signal, wherein said reflection detection means detects the reflection code on the basis of the electrical signal converted by said conversion means, and wherein said collision detection means detects the code collision on the basis of the electrical signal converted by said conversion means.

33. An apparatus according to claim 31, wherein said reflection detection means detects, when the reflection code is contained in the reception code, an amount of delay of the reflection code on the basis of the input transmission code and the reception code, and wherein said collision detection means removes the reflection code on the basis of the amount of delay of the reflection code.

34. An apparatus according to claim 31, wherein said collision detecting means detects the code collision of the basis of the reception signal from which the reflection code is removed.

35. An apparatus according to claim 31, wherein said reflection detection means further comprises a surface acoustic wave convolver, and wherein said reflection detection means detects a phase shift and an attenuation factor of the reflection code with respect to the transmission code on the basis of a convolution integral value between the transmission code and the reception code, together with the reflection code.

36. An apparatus according to claim 31, wherein said reflection detection means comprises a waveshaper and a correlator, and wherein said reflection detection means detects a phase shift of the reflection code from the transmission code on the basis of the correlation between the transmission code and the reception code shaped by said waveshaper, together with the reflection code.

37. An apparatus according to claim 35, wherein said collision detection means generates a pseudo reflection signal by shifting a phase and an amplitude of the transmission code on the basis of the detected phase shift and the attenuation factor, and removes the pseudo reflection signal from the reception code.

38. An apparatus according to claim 36, wherein said collision detection means generates a pseudo reflection signal by shifting a phase of the transmission code on the basis of the detected phase shift, and removes the pseudo reflection signal from the reception code.

39. A communication apparatus for communicating via a transmission path, comprising:
   transmission means for transmitting a transmission code to the transmission path;
   reception means for receiving a reception code from the transmission path;
   detection means, which inputs the transmission code to be transmitted by said transmission means and the reception code received by said reception means, for detecting a signal collision on the basis of the reception code and the transmission code and detecting a reflection code reflected at the transmission path, included in the reception code; and
   removing means for removing the reflection code detected by said detection means from the reception code.

40. An apparatus according to claim 39, wherein said reception means further comprises conversion means for converting an optical signal from the transmission path into an electrical signal, wherein said detection means detects the reflection code on the basis of the electrical signal converted by said conversion means, and wherein said removing means removes the reflection code on the basis of the electrical signal converted by said conversion means.

41. An apparatus according to claim 39, wherein said detection means detects, when the reflection code is contained in the reception code, an amount of delay of the reflection code on the basis of the input transmission code and the reception code, and wherein said removing means removes the reflection code on the basis of the amount of delay of the reflection code.

42. An apparatus according to claim 39, wherein said removing means detects a code collision of the basis of the reception signal from which the reflection code is removed.

43. An apparatus according to claim 39, wherein said detection means further comprises a surface acoustic wave convolver, and wherein said detection means detects a phase shift and an attenuation factor of the reflection code with respect to the transmission code on the basis of a convolution integral value between the transmission code and the reception code, together with the reflection code.

44. An apparatus according to claim 39, wherein said detection means comprises a waveshaper and a correlator, and wherein said detection means detects a phase shift of the reflection code from the transmission code on the basis of the correlation between the transmission code and the reception code shaped by said waveshaper, together with the reflection code.

45. An apparatus according to claim 43, wherein said removing means generates a pseudo reflection signal by shifting a phase and an amplitude of the transmission code on the basis of the detected phase shift and the attenuation factor, and removes the pseudo reflection signal from the reception code.

46. An apparatus according to claim 44, wherein said removing means generates a pseudo reflection signal by shifting a phase of the transmission code on the basis of the detected phase shift, and removes the pseudo reflection signal from the reception code.

47. An apparatus according to claim 39, wherein said detection means detects a correlation between the transmission code and the reflection code, and
   wherein said removing means removes the reflection code on the basis of the correlation detected by said detection means.

48. A communication apparatus for communicating via a transmission path, comprising:
   transmission means for transmitting a transmission code to the transmission path;
   reception means for receiving a reception code from the transmission path;
   reflection detection means, which inputs the transmission code to be transmitted by said transmission means and the reception code received by said reception means, for detecting a reflection code reflected at the transmission path, included in the reception code; and
   collision detection means for detecting a code collision on the basis of the reception code received by said reception means and the reflection code detected by said reflection detection means.

49. An apparatus according to claim 48, wherein said reception means further comprises conversion means for converting an optical signal from the transmission path into an electrical signal, wherein said reflection detection means detects the reflection code on the basis of the electrical signal converted by said conversion means, and wherein said collision detection means detects the code collision on the basis of the electrical signal converted by said conversion means.

50. An apparatus according to claim 48, wherein said reflection detection means detects, when the reflection code is contained in the reception code, an amount of delay of the reflection code on the basis of the input transmission code and the reception code, and wherein said collision detection means removes the reflection code on the basis of the amount of delay of the reflection code.

51. An apparatus according to claim 48 wherein said collision detection means detects the code collision on the basis of the reception signal from which the reflection code is removed.

52. An apparatus according to claim 48, wherein said reflection detection means further comprises a surface acoustic wave convolver, and wherein said reflection detection means detects a phase shift and an attenuation factor of the reflection code with respect to the transmission code on the basis of a convolution integral value between the transmission code and the reception code, together with the reflection code.

53. An apparatus according to claim 48, wherein said reflection detection means comprises a waveshaper and a correlator, and wherein said reflection detection means detects a phase shift of the reflection code from the transmission code on the basis of the correlation between the transmission code and the reception code shaped by said waveshaper, together with the reflection code.

54. An apparatus according to claim 52, wherein said collision detection means generates a pseudo reflection signal by shifting a phase and an amplitude of the transmission code on the basis of the detected phase shift and the attenuation factor, and removes the pseudo reflection signal from the reception code.

55. An apparatus according to claim 53, wherein said collision detection means generates a pseudo reflection signal by shifting a phase of the transmission code on the basis of the detected phase shift, and removes the pseudo reflection signal from the reception code.

56. An apparatus according to claim 1, wherein said detection means comprises means for detecting the signal collision by detecting a correlation between the transmission signal and the combined signal.

57. A communication apparatus for communicating via a transmission path, comprising:
transmission means for transmitting a transmission signal to the transmission path;
reception means for receiving a reception signal from the transmission path;
reflection detection means, which inputs the transmission signal to be transmitted by said transmission means and the reception signal received by said reception means, for detecting a reflection signal reflected at the transmission path, on the basis of the transmission signal and the reception signal;
removing means for removing the reflection signal from the reception signal; and
collision detection means for detecting a signal collision on the basis of the reception signal from which the reflection signal is removed by said removing means.

58. An apparatus according to claim 57, wherein said transmission means includes conversion means for performing an electro-optical conversion on the transmission signal.

59. An apparatus according to claim 57, wherein said reception means includes conversion means for performing an optical-electro conversion on the reception signal.

60. An apparatus according to claim 57, wherein said reflection detection means detects the reflection signal on the basis of a correlation between the transmission signal and the reception signal.

61. An apparatus according to claim 57, wherein said reflection detection means includes a convolver which inputs the reception signal and an inverted transmission signal.

62. An apparatus according to claim 57, wherein said reflection detection means includes a sliding correlator which inputs the reception signal and the transmission signal.

63. An apparatus according to claim 57, wherein said reflection detection means includes time difference detection means for detecting a time difference between the reflection signal and the transmission signal.

64. A communication apparatus for communicating via a transmission path, comprising:
transmission means for transmitting a transmission signal to the transmission path;
reception means for receiving a reception signal from the transmission path;
correlation means for correlating the transmission signal to be transmitted by said transmission means and the reception signal received by said reception means, and outputting a difference signal corresponding to a time difference between a reflection signal reflected at the transmission path and the transmission signal based on the correlation; and
detection means for detecting a signal collision on the basis of the difference signal from said correlation means.

65. An apparatus according to claim 64, wherein said detection means detects the signal collision on the basis of the reception signal and the difference signal.

66. An apparatus according to claim 64, wherein said transmission means includes conversion means for performing an electro-optical conversion on the transmission signal.

67. An apparatus according to claim 64, wherein said reception means includes conversion means for performing an optical-electro conversion on the reception signal.

68. An apparatus according to claim 64, wherein said correlation means includes a convolver which inputs the reception signal and an inverted transmission signal.

69. An apparatus according to claim 64, wherein said correlation means includes a sliding correlator which inputs the reception signal and the transmission signal.

70. An apparatus according to claim 64, wherein said detection means includes removing means for removing a reflection signal from the reception signal on the basis of the difference signal.

71. An apparatus according to claim 70, wherein said detection means detects the signal collision on the basis of the reception signal from which the reflection signal is removed.

72. The apparatus according to claim 64, wherein said correlation means detects the reflection signal.

73. A communication apparatus for communicating via a communication path, said communication apparatus comprising:
reception means for receiving a reception signal from the communication path, the reception signal including an interference signal from a communication by said communication apparatus;
correlation means for correlating the reception signal received through said reception means and a reference signal generated by said communication apparatus, and outputting a difference signal corresponding to a time difference between the reference signal and the interference signal, the interference signal having a correlation with the reference signal; and removing means in communication with said correlation means for removing the interference signal from the reception signal on the basis of the difference signal.

74. The apparatus according to claim 73, further comprising:

detection means for detecting a signal collision on the basis of the reception signal from which the interference signal is removed.

75. The apparatus according to claim 73, wherein said reception means includes conversion means for performing an optical-electro conversion on the reception signal.

76. The apparatus according to claim 73, wherein said correlation means includes a convolver which inputs the reception signal and the reference signal.

77. The apparatus according to claim 73, wherein said correlation means includes a sliding correlator which inputs the reception signal and the reference signal.

78. The apparatus according to claim 73, further comprising:

transmission means for transmitting a transmission signal to the transmission path.

79. The apparatus according to claim 78, wherein the reference signal is included in the transmission signal.

80. The apparatus according to claim 78, wherein said transmission means includes conversion means for performing an electro-optical conversion on the transmission signal.

* * * * *

UNITED STATES PATENT AND TRADEMARK OFFICE
CERTIFICATE OF CORRECTION

PATENT NO. : 5,390,039  
DATED : February 14, 1995  
INVENTOR(S) : Yamamoto et al.

Page 1 of 2

It is certified that error appears in the above-indentified patent and that said Letters Patent is hereby corrected as shown below: On the title page: Item

[56]    References Cited:

FOREIGN PATENT DOCUMENTS

"224730  7/1985  Germany" should read --224730  7/1985 German Democratic Republic--.

COLUMN 1:

Line 12, "IventioN" should read --Invention--;
Line 20, "used" should read --used in--; and
Line 29, "a optical" should read --an optical--.

COLUMN 2:

Line 58, "Further" should read --further--.

COLUMN 3:

Line 40, "a" should read --an--.

COLUMN 6:

Line 9, "Signal" should read --signal--; and
Line 13, "detector 3.5," should read --detector 35,--.

COLUMN 8:

Line 1, "a" should read --an--.

UNITED STATES PATENT AND TRADEMARK OFFICE
CERTIFICATE OF CORRECTION

PATENT NO. : 5,390,039
DATED : February 14, 1995
INVENTOR(S) : Yamamoto et al.

It is certified that error appears in the above-indentified patent and that said Letters Patent is hereby corrected as shown below:

COLUMN 11:

Line 66, "reception" should read --combined--.

COLUMN 13:

Line 21, "of" (first occurrence) should read --on--.

COLUMN 15:

Line 10, "of" should read --on--.

COLUMN 16:

Line 6, "of" (first occurrence) should read --on--.

COLUMN 17:

Line 6, "claim 48" should read --claim 48,--.

Signed and Sealed this

Sixteenth Day of May, 1995

Attest:

BRUCE LEHMAN

Attesting Officer

Commissioner of Patents and Trademarks